(12) United States Patent
Luo et al.

(10) Patent No.: US 12,505,266 B2
(45) Date of Patent: Dec. 23, 2025

(54) HIGH-ORDER ROTATIONAL SYMMETRY UNIT-BASED NONLINEAR GEOMETRIC PHASE METASURFACE

(71) Applicant: THE INSTITUTE OF OPTICS AND ELECTRONICS, THE CHINESE ACADEMY OF SCIENCES, Sichuan (CN)

(72) Inventors: Xiangang Luo, Sichuan (CN); Mingbo Pu, Sichuan (CN); Yan Chen, Sichuan (CN); Fei Zhang, Sichuan (CN); Xiaoliang Ma, Sichuan (CN); Xiong Li, Sichuan (CN); Zeyu Zhao, Sichuan (CN)

(73) Assignee: THE INSTITUTE OF OPTICS AND ELECTRONICS, THE CHINESE ACADEMY OF SCIENCES, Chengdu (CN)

( * ) Notice: Subject to any disclaimer, the term of this patent is extended or adjusted under 35 U.S.C. 154(b) by 8 days.

(21) Appl. No.: 18/844,513

(22) PCT Filed: Mar. 7, 2022

(86) PCT No.: PCT/CN2022/079528
§ 371 (c)(1),
(2) Date: Nov. 1, 2024

(87) PCT Pub. No.: WO2023/168555
PCT Pub. Date: Sep. 14, 2023

(65) Prior Publication Data
US 2025/0165661 A1    May 22, 2025

(51) Int. Cl.
*G06F 30/17* (2020.01)
*G06F 30/20* (2020.01)

(52) U.S. Cl.
CPC .............. *G06F 30/17* (2020.01); *G06F 30/20* (2020.01)

(58) Field of Classification Search
CPC .......... G02B 1/00; G02B 1/002; G02B 1/005; G02B 1/007
See application file for complete search history.

(56) References Cited

U.S. PATENT DOCUMENTS

2022/0011646 A1*  1/2022  Semmlinger ............. G02F 1/37
2024/0168358 A1*  5/2024  Hail .......................... G02F 1/19

FOREIGN PATENT DOCUMENTS

CN       102683866 A      9/2012
CN       108107498 A      6/2018
(Continued)

OTHER PUBLICATIONS

Li et al. Nonlinear photonic metasurfaces, (Year: 2017).*
(Continued)

*Primary Examiner* — Ephrem Z Mebrahtu (57) ABSTRACT

The present disclosure provides a high-order rotational symmetry unit-based nonlinear geometric phase metasurface, which sequentially comprises from the bottom to the top: a substrate (1); a nonlinear material layer (2); and a metasurface structure layer (3), comprising multiple super-configuration units (4) having local high-order rotational symmetry, wherein the super-configuration units (4) are periodically arranged to form a lattice structure which has global high-order rotational symmetry. Under the pumping of fundamental waves in a circular polarization state, the nonlinear geometric phase metasurface can simultaneously generate nonlinear harmonic waves having the same and opposite circular polarization states as the fundamental waves, and a nonlinear geometric phase of the generated nonlinear harmonic waves is regulated and controlled by a
(Continued)

local rotational symmetry order and lattice structure of the super-configuration units.

9 Claims, 5 Drawing Sheets

(56) References Cited

FOREIGN PATENT DOCUMENTS

| | | |
|---|---|---|
| CN | 109683334 A | 4/2019 |
| CN | 113946009 A | 1/2022 |
| JP | 2017092178 A | 5/2017 |

OTHER PUBLICATIONS

Xin Xie et al., Generalized Pancharatnam-Berry Phase in Rotationally Symmetric Meta-Atoms, Physical Review Letters, May 7, 2021, pp. 183902-1-183902-6, vol. 126, No. 18.

Wenchao Zhao, Research on High Efficiency Second-harmonic Micro-nano Functional Devices Based on Au-WS2 Hybrid Metasurface, Engineering Science and Technology I, China Doctoral Dissertations Full-text Database, Jan. 15, 2022, pp. 1-117, No. 1.

First office action of counterpart Chinese Patent Application No. 202280000514.X issued on Feb. 22, 2023.

Notice of Allowance of counterpart Chinese Patent Application No. 202280000514.X issued on Mar. 19, 2023.

International Search Report of PCT Patent Application No. PCT/CN2022/079528 issued on Dec. 7, 2022.

Written Opinion of the International Searching Authority of PCT Patent Application No. PCT/CN2022/079528 issued on Dec. 7, 2022.

* cited by examiner

HIGH-ORDER ROTATIONAL SYMMETRY UNIT-BASED NONLINEAR GEOMETRIC PHASE METASURFACE

TECHNICAL FIELD

The present disclosure relates to the technical field of electromagnetic wave modulation, and specifically to a high-order rotational symmetry unit-based nonlinear geometric phase metasurface (nonlinear geometric phase metasurface based on high-order rotational symmetry unit).

BACKGROUND ART

In linear optics, circularly polarized light interacting with anisotropic meta-structure units can generate circularly polarized light with opposite chirality. The converted light carries a geometric phase $\Phi=2\sigma\theta$, referred to as the Pancharatnam-Berry geometric phase, where $\theta$ is the rotation angle of the meta-structure unit, $\sigma=\pm 1$ represents the incident light in left-handed or right-handed circular polarization state (LCP or RCP).

A similar concept has also been introduced into nonlinear optics, where, when the fundamental-wave light with polarization state $\sigma$ is incident on the nonlinear metasurface, the generated nth harmonic of $+\sigma$ or $-\sigma$ polarization state has a geometric phase $(n-1)\sigma\theta$ or $(n+1)\sigma\theta$, referred to as the nonlinear geometric phase. The nonlinear geometric phase is independent of the structure size and material dispersion and can achieve continuous modulation from 0 to $2\pi$ by rotating the meta-structure unit. Therefore, it is widely applied in nonlinear modulation of the light.

In the nonlinear metasurface, the generation of nth harmonic of circularly polarized light needs to satisfy the selection rule: $n=Nm\pm 1$, where N is an integer, m is the rotational symmetry order of the meta-structure unit, and the symbols + and − represent harmonics having the same or opposite circular polarization state as the fundamental wave. In the case of second harmonic generation, for example, a single rotationally symmetric (C1) structure can generate second harmonic light with the same and opposite circular polarization as the fundamental wave, whereas a triple rotationally symmetric (C3) structure can only generate second harmonic light with the opposite circular polarization, and the other symmetric structures cannot generate a circularly polarized second harmonic light.

Therefore, for a specific nonlinear process, the nonlinear geometric phase can only be generated in a few specific rotational symmetry structures. Although the same process may occur in different rotational symmetric structures, the rule for nonlinear geometric phases remains unchanged. For instance, in both C1 and C3 structures, the geometric phases of circularly polarized second harmonic light with polarization states opposite to that of the fundamental wave are all $3\sigma\theta$. These restrictive relationships limit the generation and modulation flexibility of the nonlinear geometric phase.

SUMMARY

(1) Technical Problem to be Solved

To address the above issues, the present disclosure provides a high-order rotational symmetry unit-based nonlinear geometric phase metasurface, which solves the technical problems of traditional metasurfaces being significantly limited in the modulation of the nonlinear geometric phase.

(2) Technical Solution

The present disclosure provides a high-order rotational symmetry unit-based nonlinear geometric phase metasurface, including, from bottom to top, a substrate; a nonlinear material layer; a metasurface structure layer, which includes multiple meta-structure units with local high-order rotational symmetry; the meta-structure units are periodically arranged to form a lattice structure with global high-order rotational symmetry; and under the pumping of the circularly polarized fundamental wave, the nonlinear geometric phase metasurface can simultaneously generate nonlinear harmonics with the same and opposite circular polarization states as the fundamental wave.

Further, the harmonic order n of the nonlinear harmonics that simultaneously generate the same and opposite circular polarization states as the fundamental wave is 2 or 3.

Further, the local rotational symmetry order m of the meta-structure unit, the global rotational symmetry order q of the lattice structure, and the harmonic order n satisfy the following condition that both n+1 and n−1 can be evenly divided by the greatest common divisor of the local rotational symmetry order m and the global rotational symmetry order q.

Further, when the harmonic order n of the nonlinear harmonics is 2, the geometric phase of the nonlinear harmonics is $\Phi=\pm m\theta$ or $\Phi=\pm 3m\theta$, where $\theta$ is the rotation angle of the meta-structure unit. When the harmonic order n of the nonlinear harmonics is 3, the geometric phase of the nonlinear harmonics is $\Phi=\pm 2m\theta$, $\pm m\theta$, or 0.

Further, the local rotational symmetry order m of the meta-structure unit with local high-order rotational symmetry is greater than 4.

Further, the periodic arrangement of the meta-structure units includes a square lattice or a hexagonal lattice, to form a lattice structure with a global rotational symmetry order q of 4 or 6.

Further, the meta-structure unit is a sub-wavelength metallic structure, and the material of the sub-wavelength metallic structure includes but is not limited to one of gold and aluminum.

Further, the sub-wavelength metallic structure has m-order rotational symmetry, including but not limited to regular m-sided polygon and regular m-pointed star, where m is the local rotational symmetry order of the meta-structure unit.

Further, the nonlinear material layer includes but is not limited to one of indium tin oxide and lithium niobate, and the substrate includes but is not limited to one of glass and sapphire.

Further, the thickness of the meta-structure unit is $h<\lambda_0/2$, the period is $p<\lambda_0$, the thickness of the nonlinear material layer is $t<\lambda_0/2$, and the thickness of the substrate is $d\gg\lambda_0$, where $\lambda_0$ is the harmonic wavelength.

(3) Beneficial Effects

The high-order rotational symmetry unit-based nonlinear geometric phase metasurface provided by the present disclosure utilizes the coupling effect of meta-structure units and the lattice structure to simultaneously generate nonlinear harmonics with the same and opposite circular polarization states as the fundamental wave in meta-structure units with local high-order rotational symmetry. The nonlinear geometric phase of the generated nonlinear harmonics is regulated by the local rotational symmetry order of the meta-structure units and the lattice structure. This breaks the selection rule and geometric phase law in traditional nonlinear metasurfaces and enriches the methods for nonlinear light field modulation.

REFERENCE NUMERALS

1—substrate, 2—nonlinear material layer, 3—metasurface structure layer, 4—meta-structure unit.

DETAILED DESCRIPTION OF EMBODIMENTS

In order to make the objectives, technical solutions, and advantages of the present disclosure clearer and more understandable, the present disclosure is described in further detail hereinafter in connection with specific embodiments and with reference to the drawings.

The terms used herein are solely for describing specific embodiments and are not intended to limit the present disclosure. Terms such as "comprise", "include", etc., indicate the presence of the mentioned features, steps, operations, and/or components but do not exclude the presence or addition of one or more other features, steps, operations, or components.

All terms used herein (including technical and scientific terms) have the meanings as commonly understood by those skilled in the art unless otherwise defined. It should be noted that the terms used herein should be interpreted in a manner consistent with the context of the specification, rather than in an idealized or overly rigid sense.

Figure 1:
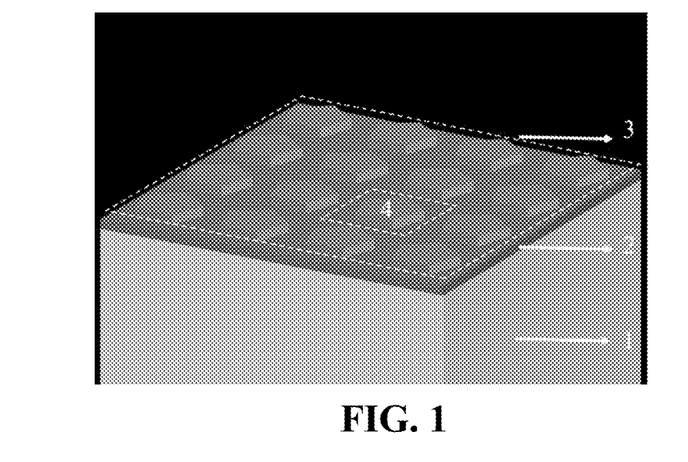
FIG. 1 schematically shows a schematic structural diagram of a high-order rotational symmetry unit-based nonlinear geometric phase metasurface according to an embodiment of the present disclosure.

The present disclosure provides an embodiment of a high-order rotational symmetry unit-based nonlinear geometric phase metasurface. As shown in FIG. 1, it sequentially includes, from bottom to top, a substrate 1; a nonlinear material layer 2; and a metasurface structure layer 3, which includes multiple meta-structure units 4 with local high-order rotational symmetry. The meta-structure units 4 are periodically arranged to form a lattice structure with global high-order rotational symmetry. The nonlinear geometric phase metasurface, under the pumping of the circularly polarized fundamental wave, can simultaneously generate nonlinear harmonics with the same and opposite circular polarization states as the fundamental wave. The nonlinear geometric phase of the generated nonlinear harmonics is regulated by the local rotational symmetry order of the meta-structure units and the lattice structure.

The symmetry of the metasurface structure layer 3 is jointly determined by the local symmetry of individual meta-structure units 4 and the global symmetry of multiple meta-structure units 4. Therefore, in the present disclosure, the nonlinear optical response is regulated by designing the structure and size of the meta-structure units 4 and the global symmetry of their lattice structure. Specifically, in the present disclosure, a metasurface structure layer 3, a nonlinear material layer 2 with a high nonlinear response in the vertical direction, and a substrate 1 with negligible nonlinear response are included. The nonlinear response mainly occurs in the nonlinear material layer 2. The array formed by the periodic arrangement of meta-structure units 4 is primarily configured to regulate the electric field symmetry and enhance the z-direction electric field in the nonlinear material layer 2, and to promote the coupling of nonlinear harmonics into free space. The substrate 1 is primarily configured to support the nonlinear material layer 2 and the metasurface structure layer 3.

The metasurface structure layer 3 adopts meta-structure units 4 with local high-order rotational symmetry, and the meta-structure units 4 are arranged to form a lattice structure with global high-order rotational symmetry. By utilizing the coupling effect of the meta-structure units 4 and the lattice structure, the nonlinear metasurface can simultaneously generate nonlinear harmonics with the same and opposite circular polarization states as the fundamental wave, and the nonlinear geometric phase of the generated nonlinear harmonics is regulated by the rotational symmetry order of the meta-structure units 4 and the lattice structure. This breaks the traditional selection rule and geometric phase law in nonlinear metasurfaces and enriches the means of nonlinear light field modulation.

Based on the above embodiment, the harmonic order n of the nonlinear harmonics that simultaneously generate the same and opposite circular polarization states as the fundamental wave is 2 or 3.

The nonlinear geometric phase metasurface of the present disclosure is applicable to the modulation of both second harmonic and third harmonic. The corresponding nonlinear material layer 2 chooses to be made of a second-order or third-order nonlinear material, and the electric field symmetry is regulated by the meta-structure units 4 to obtain nonlinear harmonics with a harmonic order n of 2 or 3.

On the basis of the above embodiments, in order to realize the above technical effects, the local rotational symmetry order m of the meta-structure units, the global rotational symmetry order q of the lattice structure, and the harmonic order n of the nonlinear harmonics of the present disclosure need to satisfy the following condition that both n+1 and n−1 can be evenly divided by the greatest common divisor of the local rotational symmetry order m and the global rotational symmetry order q.

When the local high-order rotational symmetry order m of the meta-structure units 4 does not match with the global high-order rotational symmetry order q of the lattice structure, i.e., when q cannot be evenly divided by m, the traditional selection rule can be broken. In this case, the selection rule should consider the rotational symmetry order of the overall structure, which can be expressed as the greatest common divisor of the local rotational symmetry order m of the meta-structure units 4 and the global rotational symmetry order q of the lattice structure. In designing the meta-structure units 4, the rotational symmetry order m of the meta-structure units 4 should be specifically designed according to the following rule: m needs to satisfy the condition that both (n+1) and (n−1) can be evenly divided by the greatest common divisor of the local rotational symmetry order m and the global rotational symmetry order q, and m is a positive integer greater than 4, where n is a harmonic order of the nonlinear harmonic.

The nonlinear geometric phase metasurface designed in the present disclosure can simultaneously generate nonlinear harmonics with both the same and opposite circular polarizations as the fundamental wave, and the nonlinear geometric phase is jointly determined by the polarization state of the light field, the rotational symmetry order of the meta-structure units, and the lattice structure. For the generated second harmonic (second harmonic light), the geometric phase is $\Phi=\pm m\theta$ or $\Phi=\pm 3m\theta$, where $\theta$ is the rotation angle of the meta-structure units 4. For the generated third harmonic (third harmonic light), the geometric phase is $\Phi=\pm 2m\theta$, $\pm m\theta$, or 0.

The following explains the principles of harmonic generation and geometric phase regulation in the present disclosure.

Taking the second-order nonlinear effect as an example, due to the selection rule, it is commonly believed that, in the nonlinear metasurfaces, the second harmonic generation of the circularly polarized light can only occur in C1 and C3 rotational symmetry structures. In C1 structures, the second harmonic light with the same and opposite circular polarizations as the fundamental wave can be generated, whereas, in C3 structures, only the second harmonic light with opposite circular polarization to the fundamental wave can be generated. The nonlinear geometric phase of the second harmonic light with the same and opposite circular polarizations as the fundamental wave is $\Phi=\pm\theta$ and $\Phi=\pm 3\theta$, respectively.

Thus, in a square lattice structure, for second-order nonlinear effects, meta-structure units with odd rotational symmetry orders m greater than 4 can simultaneously generate second harmonic lights with both circular polarizations. Due to the coupling effect between the meta-structure units and the lattice structure, both circularly polarized second harmonic lights can carry a geometric phase of $\Phi=\pm m$, where $\theta$ is the rotation angle of the meta-structure units 4. For example, in a C5 structure, the geometric phase of the second harmonic light can be $\Phi=\pm 5\theta$, and in a C7 structure, the geometric phase of the second harmonic light can reach $\Phi=\pm 7\theta$. This shows that the nonlinear geometric phase is regulated by the rotational symmetry order of the meta-structure units.

For the third-order nonlinear effect, meta-structure units with rotational symmetry order m greater than 4 and not integral multiples of 4 can simultaneously generate third harmonic lights with both circular polarizations. The third harmonic light with the same polarization state as the fundamental wave has a geometric phase of $\Phi=\pm 2m\theta$ (for odd m) or $\Phi=\pm m\theta$ (for even m), and the third harmonic light with the opposite polarization state to the fundamental wave has a geometric phase of 0.

In a hexagonal lattice structure, for the second-order nonlinear effect, meta-structure units with odd rotational symmetry orders m greater than 4 and not integral multiples of 3 can generate second harmonic lights with both circular polarizations. The second harmonic light with the same circular polarization state as the fundamental wave can carry a geometric phase of $\Phi=\pm m\theta$, and the second harmonic light with the opposite circular polarization state as the fundamental wave can carry a geometric phase of $\Phi=\pm 3m\theta$, which is slightly different from the square lattice case. This shows that the nonlinear geometric phase is also regulated by the lattice structure.

For the third-order nonlinear effect, meta-structure units with rotational symmetry order m greater than or equal to 4 and not integral multiples of 3 can generate third harmonic lights with both circular polarizations, and both circularly polarized third harmonic lights can carry a geometric phase of $\Phi=\pm 2m\theta$ (for odd m) or $\Phi=\pm m\theta$ (for even m).

The above is summarized in Table 1 below.

TABLE 1

| Harmonic order | Square lattice arrangement (q = 4) | Hexagonal lattice arrangement (q = 6) |
| --- | --- | --- |
| n = 2 | Odd integer greater than 4 for m | Odd integer greater than 4 and not integral multiples of 3 for m |
| n = 3 | Integer greater than 4 and not integral multiples of 4 for m | Integer greater than or equal to 4 and not integral multiples of 3 for m |

Based on the above embodiment, the present disclosure provides a local rotational symmetry order m>4 for the meta-structure units 4 with local high-order rotational symmetry.

Although when the local rotational symmetry order of the meta-structure unit 4 is 3 or 4, it can also generate nonlinear harmonics with both the same and opposite circular polarization states as the fundamental wave in specific lattices. However, the coupling effect between the meta-structure units 4 and the lattice structure is not significant enough in this case. When the local rotational symmetry order is 3 or 4, the intensity of the nonlinear harmonics with the opposite circular polarization state is much greater than the intensity of the nonlinear harmonics with the same circular polarization state. Therefore, in the present disclosure, the local rotational symmetry order m>4 is selected for the meta-structure units 4.

Based on the above embodiment, the periodic arrangement of the meta-structure units 4 includes a square lattice or a hexagonal lattice, to form a lattice structure with a global rotational symmetry order q of 4 or 6.

The periodic arrangement of the meta-structure units 4 in a square lattice or a hexagonal lattice forms a lattice structure with a specific arrangement pattern, where the lattice rotational symmetry order q of the lattice structure is 4 or 6. The higher-order rotational symmetry of the lattice structure enables a better coupling effect with the meta-structure units 4.

Based on the above embodiment, the meta-structure unit 4 is a sub-wavelength metallic structure, and the material of the sub-wavelength metallic structure of the present disclosure can include but is not limited to one of gold and aluminum.

The sub-wavelength metallic structure, arranged periodically to form a lattice structure, is primarily configured to modulate the electric field symmetry, enhance the z-direction electric field within the nonlinear material layer 2, and promote the coupling of nonlinear harmonics into free space. Rotating the sub-wavelength metallic structure by a certain angle $\theta$ about its center can result in a corresponding change of the geometric phase.

Based on the above embodiment, the sub-wavelength metallic structure has m-order rotational symmetry, including but not limited to regular m-sided polygon and regular m-pointed star, where m is the local rotational symmetry order of the meta-structure units 4.

Figure 2:
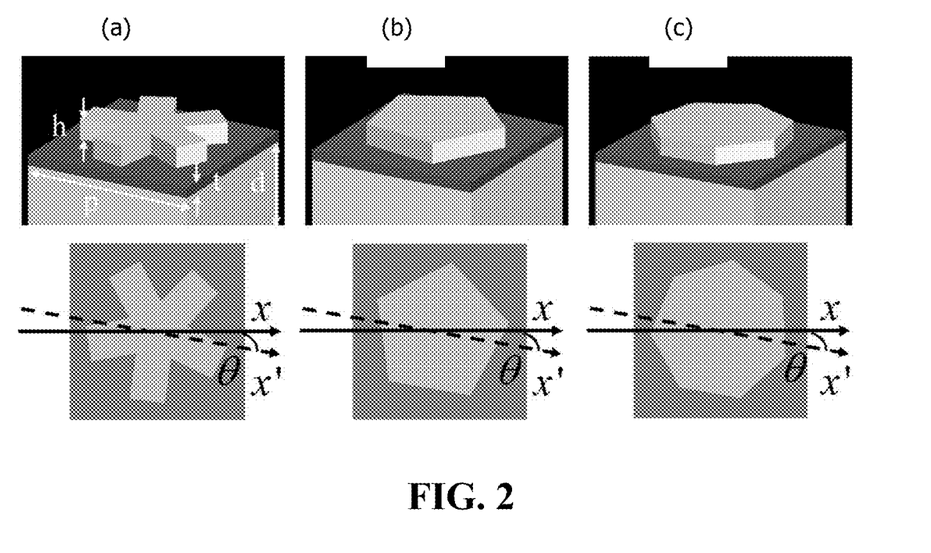
FIG. 2 schematically shows a three-dimensional view and a top view of a nonlinear geometric phase metasurfaces with three different sub-wavelength metallic structures according to an embodiment of the present disclosure.

Examples of sub-wavelength metallic structures include those with fivefold (C5) or sevenfold (C7) local high-order rotational symmetry, where the specific structures are shown in FIG. 2. FIG. 2(a) is a regular pentagram, FIG. 2(b) is a regular pentagon, and FIG. 2(c) is a regular heptagon. Of course, this is not limited to the three sub-wavelength metallic structures mentioned above; other structures with local high-order rotational symmetry are also applicable to the technical solution of the present disclosure. It should be noted that when the sub-wavelength metallic structure is a structure with a fivefold (C5), sevenfold (C7), or other odd-order rotational symmetry higher than 5, the effect is optimal when n=2 and q=4.

Based on the above embodiment, the nonlinear material layer 2 includes but is not limited to one of indium tin oxide and lithium niobate, and the substrate 1 includes but is not limited to one of glass and sapphire.

The material of the nonlinear material layer 2 can be indium tin oxide (ITO), lithium niobate, etc., where lithium niobate has a high second-order nonlinear response, and ITO has both relatively strong second-order and third-order nonlinear responses. The material of the substrate 1 can be glass, sapphire, etc., and the material of the substrate 1 only needs to have a low nonlinear response and serve as a support.

Based on the above embodiment, the thickness of the meta-structure unit 4 is $h<\lambda_0/2$, the period is $p<\lambda_0$, the thickness of the nonlinear material layer 2 is $t<\lambda_0/2$, and the thickness of the substrate 1 is $d>>\lambda_0$, where $\lambda_0$ is the harmonic wavelength.

As shown in FIG. 2, the upper part of FIG. 2 shows three-dimensional views of the nonlinear geometric phase metasurface, where the thickness and the period of the meta-structure unit 4 are h and p, respectively, and the thicknesses of the nonlinear material layer 2 and the substrate 1 are t and d, respectively. The period p of the meta-structure unit 4 needs to be smaller than the harmonic wavelength $\lambda_0$ to avoid the generation of higher-order diffraction. The thickness h of the meta-structure unit 4 is empirically chosen to be less than the harmonic half wavelength, $\lambda_0/2$, which is beneficial for efficiency optimization. The wavelength of the second harmonic is half of the wavelength of the fundamental wave, and the wavelength of the third harmonic is one-third of the wavelength of the fundamental wave.

The lower part of FIG. 2 shows a top view of the nonlinear geometric phase metasurface, wherein θ is the rotation angle of the sub-wavelength metallic structure. The initial symmetry axis of the sub-wavelength metallic structure, perpendicular to the x-axis direction, is used as the symmetry axis. The x'-axis, which is perpendicular to the symmetry axis and coincides with the x-axis in the initial position, is used as the reference axis; at this point, θ=0. When the sub-wavelength metallic structure is rotated, the symmetry axis is rotated and the reference axis x' is also rotated. The angle between the x'-axis and the x-axis is the rotation angle θ. By designing and adjusting the rotation angle θ of each sub-wavelength metallic structure, sub-wavelength metallic structure units with different rotation angles θ can be obtained; then, a sub-wavelength metallic structure array can be formed by the periodical arrangement.

By designing meta-structure units with high-order rotational symmetry, such as fivefold (C5) or sevenfold (C7), and nonlinear material layers with strong nonlinear responses in the vertical direction, and utilizing the coupling effect between the meta-structure units and the lattice structure, the present disclosure can simultaneously generate nonlinear harmonics with both the same and opposite circular polarizations as the fundamental wave, and the nonlinear geometric phase is jointly determined by the polarization state of the light field, the rotational symmetry order of the meta-structure units, and the lattice structure. This breaks the conventional understanding of the harmonic generation and geometric phase in nonlinear metasurfaces and holds great significance for the principles and applications of nonlinear light field modulation.

The following will further explain the present disclosure through specific examples. In the following examples, the above nonlinear geometric phase metasurface based on high-order rotational symmetry units is specifically described. However, the following examples are intended to exemplify the present disclosure only, and the scope of the present disclosure is not limited thereto.

Example 1

In the present example, a nonlinear metasurface with C5 rotational symmetry is chosen as an example for illustration.

The nonlinear geometric phase metasurface is composed of meta-structure units 4 that are arranged in a periodic array, a nonlinear material layer 2, and a substrate 1, wherein the meta-structure units 4 are sub-wavelength metallic structures, and the sub-wavelength metallic structures are in the shape of regular pentagons, which are periodically arranged in a square lattice to form a lattice structure. The material of the sub-wavelength metallic structure unit is gold, and its dielectric constant can be obtained from the Palik optical handbook.

The material of the nonlinear material layer 2 is ITO, and ITO is a material with a dielectric constant whose real part has a zero point. Near the wavelength where the dielectric constant is zero, the nonlinear interactions can be greatly enhanced. The relative dielectric constant of ITO can be described by the Drude model as $\varepsilon=\varepsilon_\infty-\omega_p^2/(\omega^2+i\Gamma\omega)$, where ω is the angular frequency of light. The values of other parameters in the formula can be controlled by experimental preparation conditions. In the example, the experimental test results of commercially available ITO films are used: $\varepsilon_\infty=3.0404$, $\omega_p=2.5695\times10^{13}$ Hz, $\Gamma=1.4832\times10^6$ Hz, where the zero point of the real part of the corresponding dielectric constant is located near the wavelength of 1300 nm. The maximum second-order nonlinear coefficient matrix element of ITO is $d_{33}=0.18$ pm/V.

The material of the substrate 1 is soda-lime glass, and its dielectric constant can also be found in the Palik optical handbook. COMSOL Multiphysics software is used to simulate second harmonic generation in the structure, with the wave band of the fundamental wave set between 1250 nm and 1350 nm. The optimized period and thickness of the sub-wavelength metallic structure unit are respectively p=600 nm, h=60 nm, and the side length of the regular pentagon is 200 nm. The thickness t of the nonlinear material layer 2 is 15 nm, and the thickness d of the substrate 1 is 1 mm.

Figure 3:
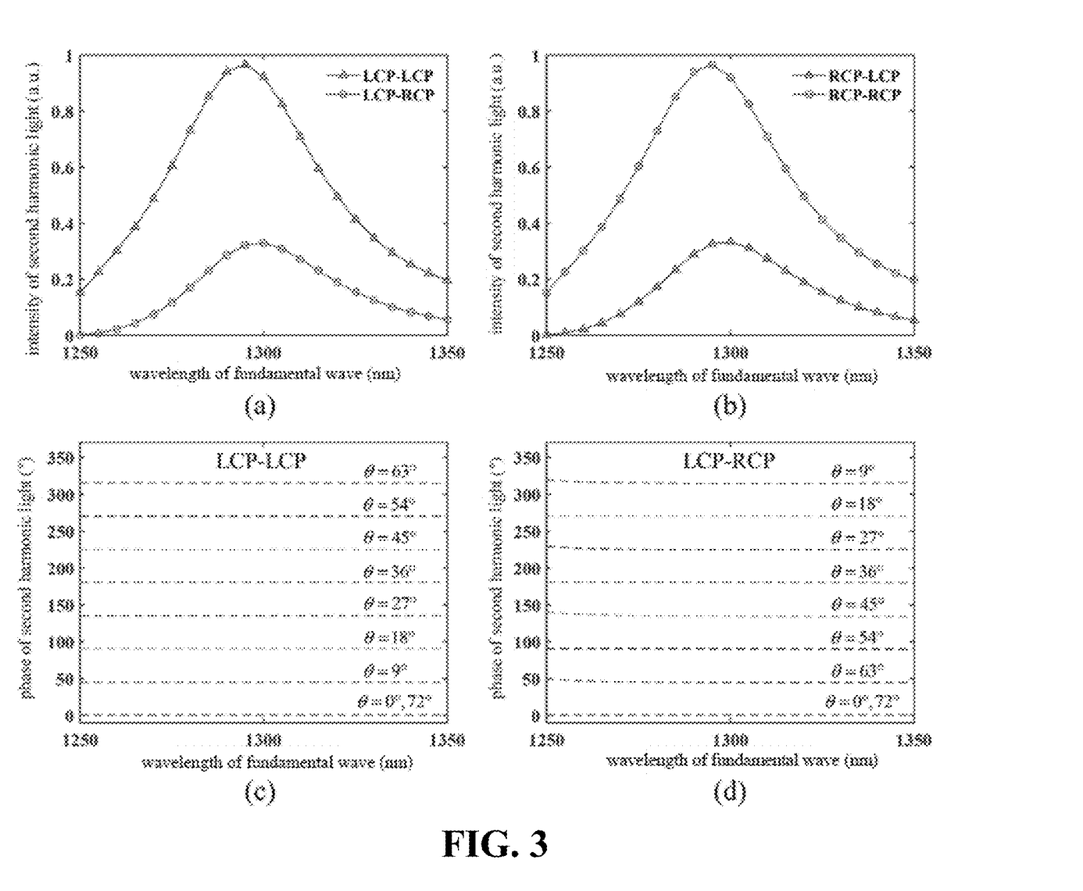
FIG. 3 schematically shows a simulation result of second harmonic generation in a nonlinear geometric phase metasurface designed according to Example 1 of the present disclosure.

FIG. 3 shows the simulation results for the second harmonic generation in the designed nonlinear geometric phase metasurface. FIGS. 3(a) and 3(b) show the intensities of the different circularly polarized harmonic components of the second harmonic light (i.e., the second harmonic) under incidence of left-handed and right-handed circularly polarized fundamental wave, respectively. FIGS. 3(c) and 3(d) show respectively the geometric phases of the left-handed and right-handed circularly polarized second harmonic lights (i.e., the second harmonics) generated under the incidence of the left-handed circularly polarized fundamental wave light.

The intensity of the second harmonic light as a function of wavelength is shown in FIGS. 3(a) and 3(b). Under the incidence of left-handed and right-handed fundamental wave light, two circularly polarized second harmonic lights can be generated in the structure. Near the zero point of the dielectric constant of ITO, the intensity of the second harmonic light is significantly enhanced. This indicates that the conventional selection rule in nonlinear metasurfaces is broken.

FIGS. 3(c) and 3(d) demonstrate the change in the geometric phase of the left-handed and right-handed circularly polarized second harmonic lights as the rotation angle of the meta-structure units under the incidence of the left-handed fundamental wave light. It can be seen that for every 9° rotation of the sub-wavelength metallic structure unit, the phase of the left-handed and right-handed circularly polarized second harmonic lights changes by +45° and −45°, respectively, and the corresponding geometric phases respectively satisfy $\Phi=5\theta$ and $\Phi=-5\theta$.

Next, a nonlinear beam deflection device is designed by rotating sub-wavelength metallic structure units to verify the phase gradient. Twenty-four metal structure units with rotation angles each increasing by 3° are arranged along the x direction to form a meta-structure unit, and the meta-structure units are then periodically arranged. When the in-plane fundamental wave light that are left-handed circularly polarized are incident from below, the generated left-handed and right-handed second harmonic lights deflect in the +x and −x directions, respectively, with deflection angles $\psi=\pm\arcsin(\lambda/P)$. Here, $\lambda$ is the wavelength of the second harmonic light, $P=24p$ is the length of the meta-structure unit, and p is 600 nm.

Figure 4:
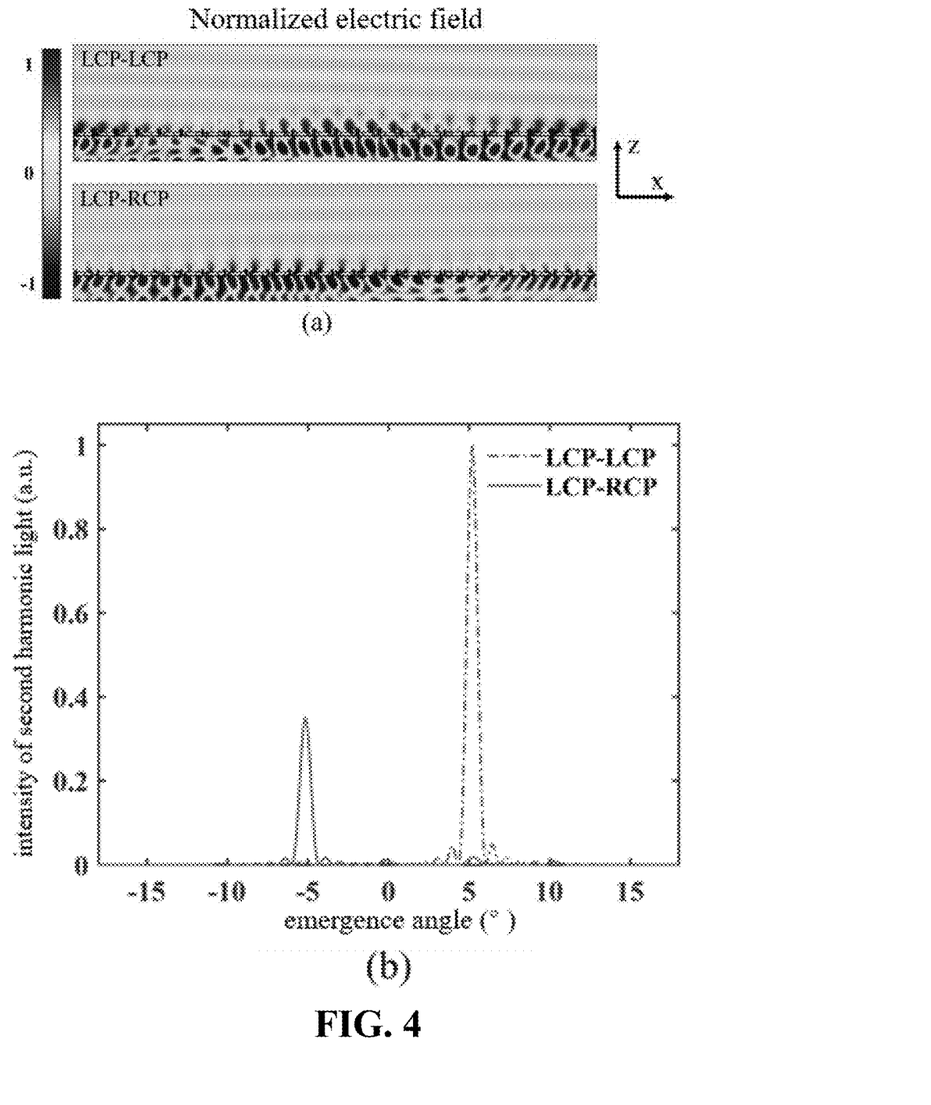
FIG. 4 schematically shows a simulation result of a deflection device designed using a meta-structure unit structure according to Example 1 of the present disclosure.

FIG. 4 shows the simulation results of the deflection device designed using the above meta-structure unit structure, where FIG. 4(a) shows the normalized electric field distribution of the different circularly polarized components of the second harmonic light in section, and FIG. 4(b) shows the far-field intensity distribution of the second harmonic light.

Specifically, FIG. 4(a) shows the simulation results of the normalized electric field distribution of the two circularly polarized components of the second harmonic light under the incidence of left-handed fundamental wave lights at 1300 nm. It can be seen that the second harmonic light with different polarizations is deflected in different directions. Far-field analysis indicates that the diffraction angles of the left-handed and right-handed circularly polarized second harmonic lights are +5.2° and −5.2°, respectively, consistent with the theoretical calculation results, as shown in FIG. 4(b).

Example 2

In the present example, a nonlinear metasurface with C7 rotational symmetry is chosen as an example for illustration.

Figure 5:
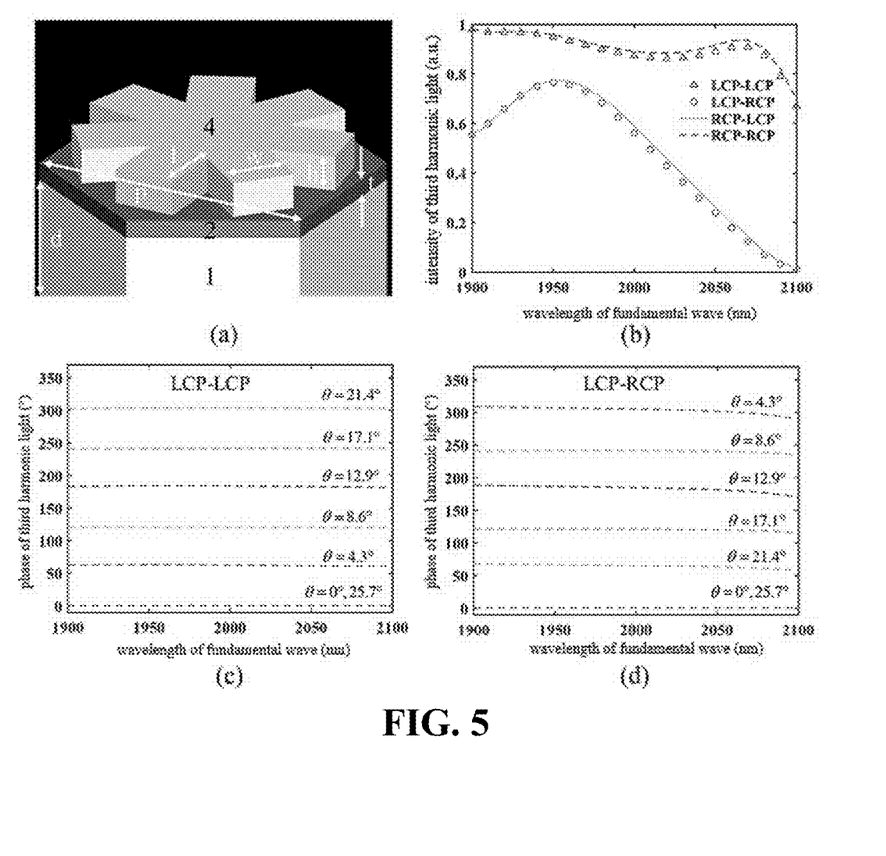
FIG. 5 schematically shows a schematic structural diagram of a nonlinear geometric phase metasurface and a simulation result of third harmonic generation according to Example 2 of the present disclosure.

The nonlinear geometric phase metasurface is composed of meta-structure units 4 that are arranged in a periodic array, a nonlinear material layer 2, and a substrate 1, as shown in FIG. 5(a). The meta-structure units 4 are sub-wavelength metallic structures, and the sub-wavelength metallic structure units are in the shape of regular heptagram, which are periodically arranged in a hexagonal lattice to form a lattice structure. The material of the sub-wavelength metallic structure unit is aluminum, and its dielectric constant can be obtained from the Palik optical handbook.

The material of the nonlinear material layer 2 is still ITO, which is the same as that in Example 1, but here the third-order nonlinear effect of ITO is utilized. The relative dielectric constant of ITO varies under different preparation conditions. Here, the Drude model is used to describe it as $\varepsilon=\omega_\infty-\omega_p^2/(\omega^2+i\Gamma\omega)$, with $\varepsilon_\infty=1.0878$, $\omega_p=1.0419\times10^{13}$ Hz, $\Gamma=4.0950\times10^6$ Hz, where the zero point of the real part of the corresponding dielectric constant is located near the wavelength of 2000 nm. The maximum third-order nonlinear coefficient matrix element of ITO is $\chi_{1111}=3.5\times10^{-18}$ m$^2$/V$^2$.

The material of the substrate 1 is soda-lime glass, and its dielectric constant can also be found in the Palik optical handbook. COMSOL Multiphysics software is used to simulate third harmonic generation in the structure, with the wave band of the fundamental wave is set between 1900 nm and 2100 nm. The optimized period and thickness of the sub-wavelength metallic structure unit are respectively p=600 nm, h=100 nm, and the edge length and width of the regular heptagram are l=120 nm and w=130 nm, respectively. The thickness t of the nonlinear material layer 2 is 15 nm, and the thickness d of the substrate 1 is 1 mm.

FIG. 5(b)-(d) shows the simulation results for the third harmonic generation in the designed nonlinear geometric phase metasurface. FIG. 5(b) shows the intensities of the different circularly polarized harmonic components of the third harmonic light (i.e., the third harmonic) under incidence of left-handed and right-handed circularly polarized fundamental wave. FIG. 5(c) and FIG. 5(d) respectively show the geometric phases of the left-handed and right-handed circularly polarized third harmonic lights (i.e., the third harmonics) generated under the incidence of the left-handed circularly polarized fundamental wave light.

The intensity of the third harmonic light as a function of wavelength is shown in FIG. 5(b). Under incidence of left-handed and right-handed fundamental wave light, two circularly polarized third harmonic lights are generated in the structure. Since the nonlinear process is influenced by both the electric field intensity and overlap integral, the position where the third harmonic generation is strongest is not exactly located at the zero point wavelength of the dielectric constant of ITO. This indicates that the conventional selection rule in nonlinear metasurfaces is broken.

FIGS. 5(c) and 5(d) demonstrate the change in the geometric phase of the left-handed and right-handed circularly polarized third harmonic lights as the rotation angle of the meta-structure units under the incidence of the left-handed fundamental wave light. It can be seen that for every 4.3° rotation of the sub-wavelength metallic structure unit, the phase of the left-handed and right-handed circularly polarized third harmonic lights changes by +600 and −60°, respectively, and the corresponding geometric phases respectively satisfy $\Phi=14\theta$ and $\Phi=-14\theta$.

The specific embodiments described above illustrate in further detail the objectives, technical solutions, and beneficial effects of the present disclosure. It should be understood that the foregoing are only specific embodiments of the present disclosure and are not intended to limit the present disclosure. Any modifications, equivalent substitutions, improvements, etc., made within the spirit and principles of the present disclosure shall be included within the scope of protection of the present disclosure.

What is claimed is:

1. A high-order rotational symmetry unit-based nonlinear geometric phase metasurface, comprising, from bottom to top,
   a substrate;
   a nonlinear material layer; and a metasurface structure layer comprising multiple meta-structure units with local high-order rotational symmetry, wherein the meta-structure units are periodically arranged to form a lattice structure with global high-order rotational symmetry; and the nonlinear geometric phase metasurface, under a pumping of a circularly polarized fundamental wave, is able to simultaneously generate nonlinear harmonics with same and opposite circular polarization states as the fundamental wave, wherein a local rotational symmetry order m of the meta-structure unit, a global rotational symmetry order q of the lattice structure, and the harmonic order n satisfy a condition that both n+1 and n−1 can be evenly divided by a greatest common divisor of the local rotational symmetry order m and the global rotational symmetry order q.

2. The high-order rotational symmetry unit-based nonlinear geometric phase metasurface according to claim 1, wherein a harmonic order n of the nonlinear harmonics that simultaneously generate the same and opposite circular polarization states as the fundamental wave is 2 or 3.

3. The high-order rotational symmetry unit-based nonlinear geometric phase metasurface according to claim 1, wherein, when the harmonic order n of the nonlinear harmonics is 2, a geometric phase of the nonlinear harmonics is $\Phi=\pm m\theta$ or $\Phi=\pm 3m\theta$, where $\theta$ is a rotation angle of the meta-structure unit; and when the harmonic order n of the nonlinear harmonics is 3, a geometric phase of the nonlinear harmonics is $\Phi=\pm 2m\theta$, $\pm m\theta$, or 0.

4. The high-order rotational symmetry unit-based nonlinear geometric phase metasurface according to claim 1, wherein the local rotational symmetry order m of the meta-structure unit with local high-order rotational symmetry is greater than 4.

5. The high-order rotational symmetry unit-based nonlinear geometric phase metasurface according to claim 1, wherein a periodic arrangement of the meta-structure units comprises a square lattice or a hexagonal lattice, to form the lattice structure with the global rotational symmetry order q of 4 or 6.

6. The high-order rotational symmetry unit-based nonlinear geometric phase metasurface according to claim 1, wherein the meta-structure unit is a sub-wavelength metallic structure, and a material of the sub-wavelength metallic structure comprises one of gold and aluminum.

7. The high-order rotational symmetry unit-based nonlinear geometric phase metasurface according to claim 6, wherein the sub-wavelength metallic structure is of a shape of a regular m-sided polygon or a regular m-pointed star, and m is the local rotational symmetry order of the meta-structure unit.

8. The high-order rotational symmetry unit-based nonlinear geometric phase metasurface according to claim 1, wherein the nonlinear material layer comprises one of indium tin oxide and lithium niobate, and the substrate comprises one of glass and sapphire.

9. The high-order rotational symmetry unit-based nonlinear geometric phase metasurface according to claim 1, wherein a thickness of the meta-structure unit is $h<\lambda_0/2$, a period is $p<\lambda_0$; and a thickness of the nonlinear material layer is $t<\lambda_0/2$, and a thickness of the substrate is $d>>\lambda_0$, where $\lambda_0$ is a harmonic wavelength.

* * * * *